United States Patent
Roth et al.

(10) Patent No.: US 9,279,728 B2
(45) Date of Patent: *Mar. 8, 2016

(54) EXECUTABLE CODE IN DIGITAL IMAGE FILES

(71) Applicant: FLIR Systems AB, Täby (SE)

(72) Inventors: Björn Roth, Hägersten (SE); Magnus Boman, Täby (SE)

(73) Assignee: FLIR Systems AB, Täby (SE)

( * ) Notice: Subject to any disclaimer, the term of this patent is extended or adjusted under 35 U.S.C. 154(b) by 5 days.

This patent is subject to a terminal disclaimer.

(21) Appl. No.: 14/083,354

(22) Filed: Nov. 18, 2013

(65) Prior Publication Data

US 2014/0078295 A1    Mar. 20, 2014

Related U.S. Application Data

(63) Continuation of application No. 12/344,079, filed on Dec. 24, 2008, now Pat. No. 8,595,689.

(51) Int. Cl.
| | |
|---|---|
| G06F 9/44 | (2006.01) |
| G06F 9/45 | (2006.01) |
| G01J 5/08 | (2006.01) |
| H04N 5/33 | (2006.01) |

(52) U.S. Cl.
CPC ............... *G01J 5/0803* (2013.01); *H04N 5/33* (2013.01); *G06F 8/20* (2013.01); *G06F 8/30* (2013.01); *G06F 8/36* (2013.01)

(58) Field of Classification Search
CPC ............... G06F 8/30; G06F 8/40; G06F 8/36; G06F 8/20; G01J 5/0803; H04N 5/33
See application file for complete search history.

(56) References Cited

U.S. PATENT DOCUMENTS

| | | | |
|---|---|---|---|
| 5,844,568 | A | 12/1998 | Luther |
| 5,875,331 | A * | 2/1999 | Lindsey ............ G06F 8/10 717/108 |
| 6,052,487 | A | 4/2000 | Ito |
| 6,795,048 | B2 | 9/2004 | Lie |

(Continued)

OTHER PUBLICATIONS

Luigi Catuogno, A Format-Independent Architecture for Run-Time Integrity Checking for Executable code, 2002, pp. 1-15.*

(Continued)

*Primary Examiner* — Thuy Dao
*Assistant Examiner* — Mongbao Nguyen
(74) *Attorney, Agent, or Firm* — Haynes and Boone, LLP

(57) ABSTRACT

The invention relates to a method and an apparatus for processing information in images pictured by infrared cameras comprising the steps of receiving radiation from at least one object in an area; extracting radiometric information from the radiation; transforming the radiometric information into at least one digital image file; storing the at least one digital image file and at least one digital function file comprising an executable code characterised by the steps of merging the executable code of the at least one digital function file into or with the at least one digital image file, thereby generating an executable digital image file, wherein the executable code comprises at least one instruction and is written in a programming language independent of system architecture. The invention further relates to a computer program product.

17 Claims, 4 Drawing Sheets

(56) References Cited

U.S. PATENT DOCUMENTS

| | | | |
|---|---|---|---|
| 6,931,633 B1 | 8/2005 | Vazquez et al. | |
| 7,093,974 B2 * | 8/2006 | Kienitz | G01J 5/02 348/E5.026 |
| 7,194,732 B2 | 3/2007 | Fisher et al. | |
| 7,197,529 B2 | 3/2007 | Nakagawa et al. | |
| 7,383,541 B1 | 6/2008 | Banks et al. | |
| 7,404,181 B1 | 7/2008 | Banning et al. | |
| 7,408,571 B2 | 8/2008 | Tanaka et al. | |
| 7,757,206 B2 | 7/2010 | Doggen | |
| 7,962,898 B1 | 6/2011 | Petry et al. | |
| 2002/0152287 A1 | 10/2002 | Nakagawa et al. | |
| 2003/0146975 A1 * | 8/2003 | Joung | H04N 5/3675 348/164 |
| 2004/0264542 A1 * | 12/2004 | Kienitz | 374/120 |
| 2005/0029453 A1 * | 2/2005 | Allen | G01J 5/06 250/332 |
| 2005/0064400 A1 * | 3/2005 | Guo | C12Q 1/6827 435/6.11 |
| 2005/0235272 A1 | 10/2005 | Skinner | |
| 2005/0289264 A1 * | 12/2005 | Illowsky | G06F 1/3203 710/104 |
| 2005/0289508 A1 | 12/2005 | Illowsky et al. | |
| 2006/0008141 A1 | 1/2006 | Lin et al. | |
| 2006/0037007 A1 | 2/2006 | Snyder et al. | |
| 2006/0220888 A1 * | 10/2006 | Germouni et al. | 340/605 |
| 2006/0230396 A1 * | 10/2006 | Martinez | G06F 9/4428 717/173 |
| 2007/0136717 A1 | 6/2007 | Ueda | |
| 2007/0145273 A1 * | 6/2007 | Chang | H04N 5/33 250/338.1 |
| 2007/0168937 A1 | 7/2007 | Mallick | |
| 2008/0086720 A1 | 4/2008 | Lekel | |
| 2008/0123973 A1 | 5/2008 | Cho et al. | |
| 2008/0252455 A1 * | 10/2008 | McTigue | G06K 19/0707 340/572.1 |
| 2008/0306705 A1 * | 12/2008 | Luo | B61K 9/04 702/134 |
| 2009/0089234 A1 * | 4/2009 | Sturrock | G05B 17/02 706/45 |
| 2009/0094585 A1 | 4/2009 | Choi et al. | |
| 2009/0100413 A1 | 4/2009 | Nash | |
| 2009/0303317 A1 * | 12/2009 | Tesar | C03C 17/3417 348/65 |
| 2009/0310821 A1 | 12/2009 | Connell, II | |
| 2010/0052885 A1 * | 3/2010 | Hanqvist | G01J 5/0022 340/436 |

OTHER PUBLICATIONS

Frederick Wieland, Object-Oriented Design of a Scene Generation Simulation, 1994, pp. 174-179.*

Martin C. Rinard, Jade: A High-Level, Machine-Independent Language for Parallel Programming, 1993, pp. 1-13.*

Subbarao et al., "User Friendly Digital Image Processing System for Low Energy Electron Diffraction Applications", Florida International University, 1993, pp. 5, University Park, Miami Florida.

Wilburn et al., "High Performance Imaging Using Large Camera Arrays", Electrical Engineering Department Stanford University, Computer Science Department Stanford University, 1996, pp. 12.

KMUTT, "Introduction to Open Dragon", Copyright Global Software Institute and KMUTT, Jan. 11, 2006, pp. 1-25.

* cited by examiner

EXECUTABLE CODE IN DIGITAL IMAGE FILES

CROSS REFERENCE TO RELATED APPLICATIONS

This application is a continuation of U.S. patent application Ser. No. 12/344,079 filed Dec. 24, 2008 (issuing Nov. 26, 2013 as U.S. Pat. No. 8,595,689) which is incorporated herein by reference in its entirety.

TECHNICAL FIELD

The present invention relates to image processing in infrared cameras.

BACKGROUND

It is becoming more common to use various kinds of non-contact measurement equipment such as infrared cameras or pyrometers in order to measure the absolute temperatures or temperature differences on objects. The advantages of using an infrared camera are many. One of the most obvious is that the user will get a quick and complete temperature measurement of an object, and that the user could cover a more extensive area than is possible for most of the other means of measurement, like non-contact pyrometers or direct contact temperature devices such as platinum resistance thermometers, thermocouples or thermistors. For example, a user of a pyrometer will have to point the aperture of the pyrometer in lots of different directions trying to cover the area of interest; or if direct contact temperature devices are used, place them at specific points. Although many of these methods in certain situations have advantages over the use of infrared cameras, the risk of leaving an essential part undetected could never be completely avoided.

Infrared cameras are used today in a plurality of applications. An example is monitoring and controlling various technical systems, where the infrared cameras can help in detecting overheated system components like reactors, fans, valves, dynamos, transformers or other essential parts. The detection could also concern situations where frozen components or parts could lead to a risk of malfunction. Since significant information about the condition of a technical system can be given by measuring the temperatures, the use of infrared cameras is an easy and reliable way of identifying problems before a failure occurs due to stress in such a system.

Infrared cameras in related art typically utilise predefined parameterised functions implemented at a plurality of platforms. Examples of such platforms could be the infrared cameras themselves or other programmable devices related to the cameras like the software of a computer. The radiation captured and stored by the infrared camera is used together with these predefined functions to perform e.g. a temperature measurement or alarm analysis of the captured infrared radiation. An example of such a measuring function is the use of programmable coefficients or parameters accounting for the emissivity and reflectivity of the material of an object necessary for reliable temperature measurements of the object. An example of an alarm function could be one that triggers an alarm when at least one pixel value exceeds a defined temperature threshold value of the image. This could either activate a small internal alarm to alert the camera operator, or be used as a stationary monitoring device sending the alarm signal to a major warning system which comprises of light and sound sirens, for example in industries handling explosive chemicals. Other examples of predefined functions are readouts of maximum, minimum or average temperature values in an image, or readings concerning the temperature of particular spots or especially interesting areas. Isotherms (regions of an image having the same temperature) could also be emphasized by highlighting those regions with some sort of indication (e.g. colour, line); furthermore, the information in each pixel could be retrieved and used in analysis by standard programs.

A problem in having to implement these parameterised functions in advance arises when new or more advanced functions are needed or asked for by customers. The functionality of these predefined functions is fixed and realizing new or updated versions in order to change the functionality is both inefficient and cumbersome, since they must be implemented in advance at each of the platforms. In related art such an update is often related to a product release, in which case a user may have to wait for a long period of time. If the requirements change during the time period, the update may even be obsolete when it is released. The requirements may also differ between customers, in which case the customer might have to reduce his or her desires. This inherent lack of flexibility urges the need of a more adaptable concept.

SUMMARY

It is therefore an object of the present invention to provide a method and an apparatus to achieve a more flexible concept without having to implement the functionality in advance.

The invention relates to a method for processing information in images comprising the steps of receiving radiation from at least one object in an area; extracting radiometric information from the radiation; transforming the radiometric information into at least one digital image file; storing the at least one digital image file and at least one digital function file comprising an executable code characterised by the steps of merging the executable code of the at least one digital function file into or with the at least one digital image file, thereby generating an executable digital image file, wherein the executable code comprises at least one instruction and is written in a programming language independent of system architecture.

The invention also relates to an apparatus for processing information in images comprising a lens assembly arranged to receive radiation; a detector array for extracting radiometric information from the radiation; a processing unit arranged to transform and process the radiometric information into at least one digital image file; a memory storage providing means for storing the at least one digital image file and at least one digital function file comprising an executable code characterised in that the processing unit comprises a central processing unit which is arranged to merge the executable code of the at least one digital function file into the at least one digital image file, thereby generating an executable digital image file, wherein the executable code comprises at least one instruction and is written in a programming language independent of system architecture.

The invention further relates to a computer program product for use in central processing unit in a processing unit of an apparatus for processing information in images, which comprises computer readable code means, which when run in the central processing unit causes said central processing unit to perform the steps of merging an executable code of at least one digital function file into or with the at least one digital image file, thereby generating an executable digital image file, wherein the executable code comprises at least one instruction and is written in a programming language independent of system architecture.

Hence, the invention relates to a method and an apparatus for processing information in image files where the functionality will be accessible directly from within the executable digital image files themselves and exists in association with the file. Further, a cross-platform compatibility of the executable digital image file is achieved, or in other words, the executable digital image file can be executed independently of system architecture or platforms (i.e. software/hardware architectures) and transferred between and through different interfaces of such systems (e.g. computer/camera).

Further the invention relates to a method and an apparatus for executing the at least one instruction in order to use the radiometric information in the executable digital image file and to implement and retrieve functionality within the executable digital image file, where the instructions typically use the radiometric information in alarm and/or measurement functions. New functions can easily be implemented to fit different environments and situations. Another advantage is that the functions could be retrieved from within the files independently of system architecture.

The method and apparatus also make it possible to perform an interactive comparing analysis of the information comprised in at least two separate executable digital images files, creating the opportunity to validate aberrations in a structured and reliable way. By this any aberration between any two images, e.g. taken in the same location but at different time occasions, will be dealt with systematically.

With the method and apparatus it is also possible to retrieve at least one digital function file comprising the executable code, and in one embodiment of the present invention even to link the executable code of the at least one digital function file with the at least one digital image file instead of merging these entities with each other.

By the method and apparatus it is also possible to generate the at least one instruction comprised in the executable code by the means of at least one of the plurality of control devices. Here a user can program the functionality he wants to achieve with a great degree of liberty.

Further advantageous embodiments of the apparatus, the method and the computer program product are set forth in the dependent claims, which correspondently describe further advantageous embodiments of the present invention.

DETAILED DESCRIPTION

Figure 1:
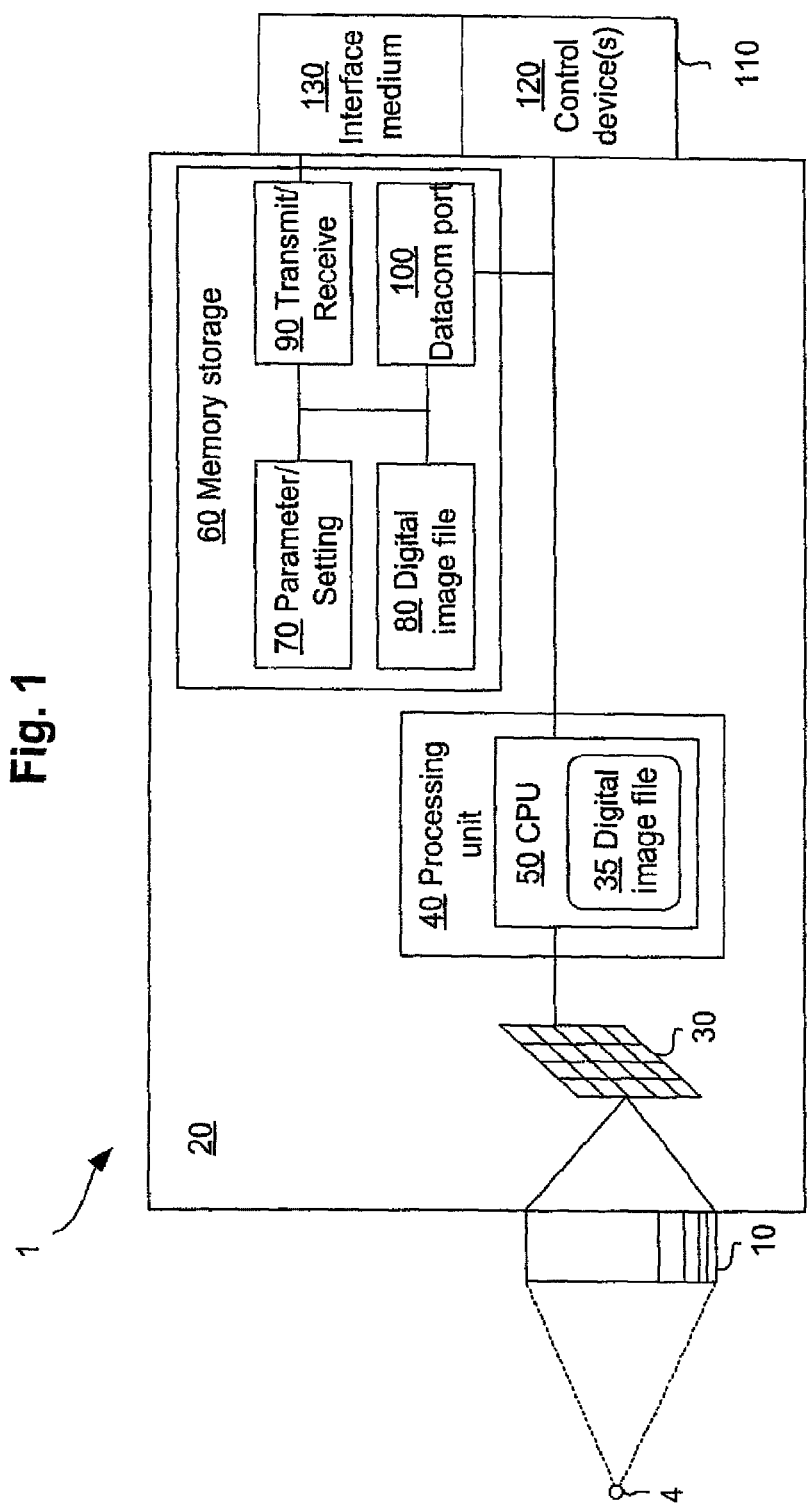
FIG. 1 shows an infrared camera according to the invention.

In FIG. 1, an infrared camera 1 according an embodiment of the invention is shown. The infrared camera 1 comprises three main parts, a lens assembly 10 at one end for capturing radiation and at the other end an assembly 110 which may comprise a plurality of control devices 120 and at least one interface medium 130. The plurality of control devices 120 could for example be a display, record/push-buttons and thumb-joysticks for programming, parameter settings and menu selection from a display, respectively. The at least one interface medium 130 could comprise removable SD-memory cards (secure digital cards), wire- or wireless communications means like USB (universal serial bus), FireWire standards and IrDA (Infrared Data Association) or other short distance communication standards. Between these ends lays a main body 20 which may comprise a plurality of sub-assemblies or parts (e.g. processing unit, memory, A/D-converter, infrared detector array, etc.).

After the radiation emitted from an object 4 reaches the lens assembly 10, which could comprise of one or more high quality lenses, it is focused and directed towards a detector array 30 in an appropriate manner. The detector array 30, preferably an infrared detector array (for example a cooled or uncooled focal plane array), comprises individual sensors or pixels, which are sensitive to a range of the infrared radiation spectrum. The detector array 30 transforms the radiation into electrical analogue signals. This information of the radiation, which at present may be in the form of electrical analogue signals, is then further transformed into digital information, e.g. a digital image file 35, by a processing unit 40. The processing unit 40 may typically comprise a central processing unit (CPU) 50, an analogue-to-digital (AID) converter and other processing circuitry (not shown). Thus, the radiation information is captured by the IR camera 1, and in all essence interpreted in a digital file format as a temperature measurement of the object 4.

Furthermore, the digital image file 35 may then be registered and further processed by the central processing unit (CPU) 50 comprised in the processing unit 40. The processing unit 40 and the central processing unit (CPU) 50 may be arranged to communicate with and have access to all parts of a memory storage 60. This may, for example, be performed through a data communication port 100 in the memory storage 60. The processing unit 40 may also be connected to at least one of the plurality of control devices 120.

In order to achieve reliable and comparable measurements, the captured infrared radiation is taken in comparison with some additional information which may comprise calibration constants, camera and accessories settings, registration for background radiation, as well as destructive and nondestructive data (e.g. a compressed data format like MEG and an uncompressed raw format, like PNG, respectively). Other types of data are also possible. This additional data may be stored in a file parameter/setting storage section 70.

Once the information of the radiation is captured in the digital image file 35 and then processed by the processing unit 40, using any or all information contained in the file parameter/setting storage section 70, the digital image file 35 may be stored in a digital image file storage section 80. The processing unit 40 may be arranged to retrieve the digital image file 35 from the digital image file storage section 80 at any point in time.

The processing unit 120 may be arranged to communicate with and be connected to the parameter/setting storage section 70 the digital image file storage section 80, the transmitting/receiving file storage section 90 and at least one of the plurality of control devices 120 by using, for example, the data communications port 100.

Figure 2:
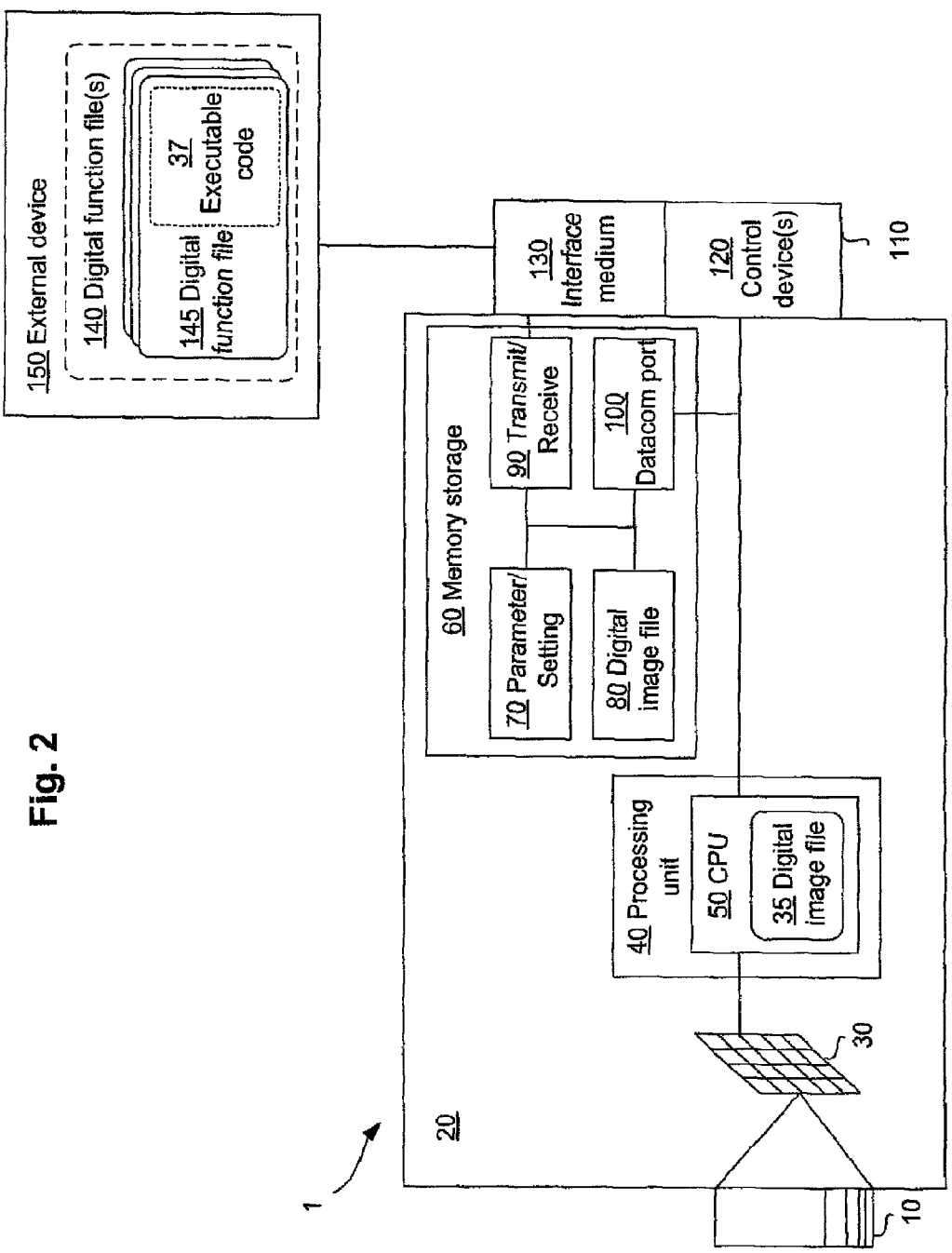
FIG. 2 shows an infrared camera attached to an external device.

In FIG. 2, the infrared camera 1 and an external device 150 are shown. The external device 150 may be any sort of external memory storage device. Some examples of such external memory storage devices are a computer, a server at an internet address, another infrared camera, a CD (compact disc), memory stick (USB, SD), etc. From the external device 150, a set of digital function files 140, or file functions, comprising at least one digital function file 145 (but more generally the set comprises a plurality of digital function files, or file functions), may be selected.

The digital function files or file functions 140 comprised in the external device 150 may be communicated to the IR camera 1 by, for example, means of the interface medium 130. The digital function files or file functions 140 may be placed in the transmitting/receiving file storage section 90 of the memory storage 60. This could, for example, be realized by a downloadable package comprising the digital function files 140. The at least one digital function file 145 may comprise an executable code 37 which may be arranged to be merged with the digital image file 35 contained in the digital image file storage section 80.

According to one embodiment of the invention it is also possible for the memory storage 60 and/or the transmitting/receiving file storage section 90 to comprise at least one digital function file 145 before any communication with an external device 150 is performed by the IR camera 1.

Figure 3:
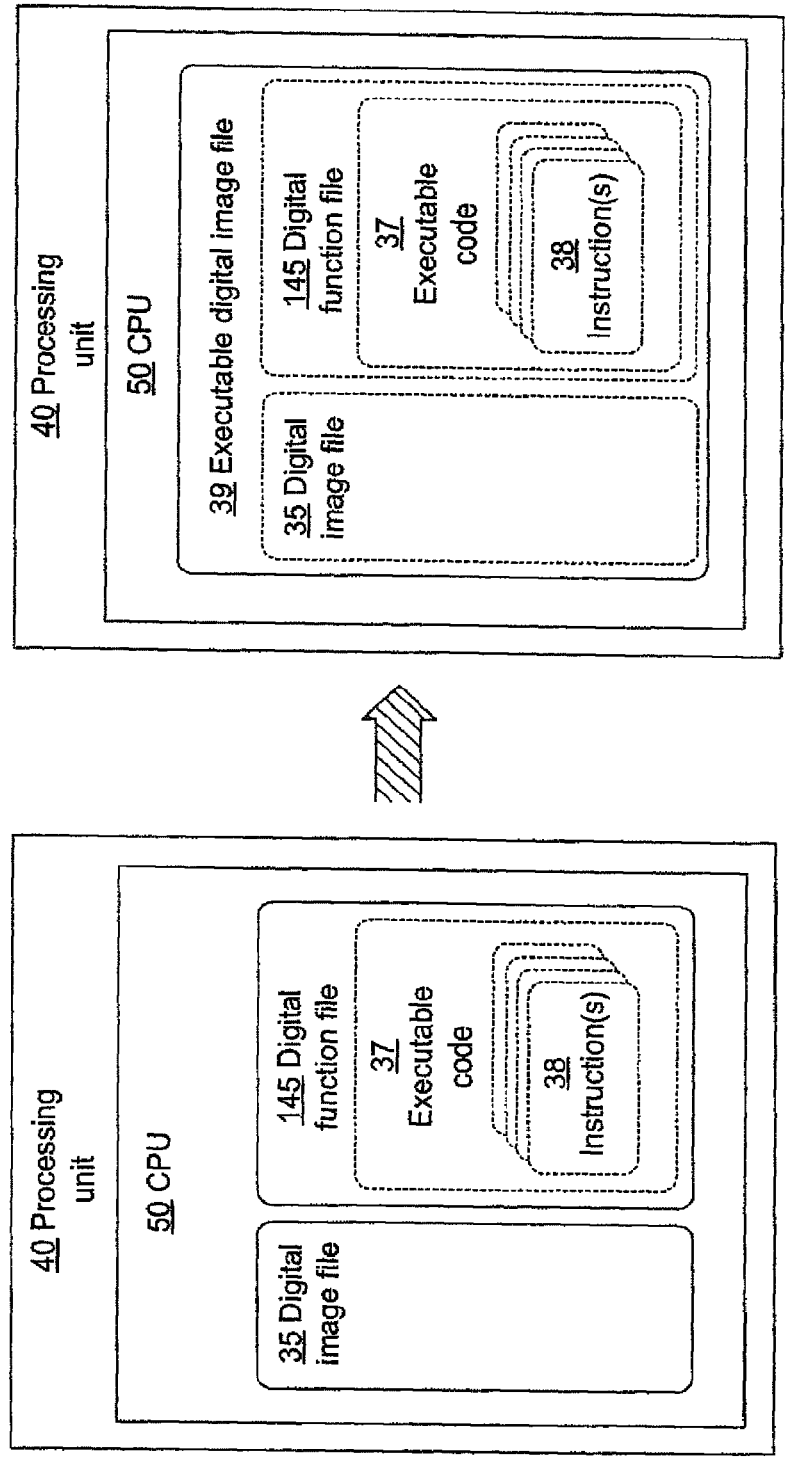
FIG. 3 shows an image file according to the invention.

FIG. 3 shows a digital image file 35 and a digital function file 145 (or file function) comprised in the processing unit 40 and being processed by the central processing unit (CPU) 50. In one preferred embodiment of the invention, the digital image file 35 and the at least one digital function file 145 (or file function) may be communicated to or retrieved by the processing unit 40 together or in successive order from the memory storage 60. The processing unit 40 may then be arranged to merge or embed the executable code 37 comprised in and carried by the digital function file 145 with the digital image file 35 in the central processing unit 50 (as indicated by the arrow in FIG. 3). This may generate an executable digital image file 39, that is, a digital image file comprising executable code. After this transformation into an executable digital image file 39, further steps could in turn be to perform actions in accordance with at least one instruction 38 (normally a collection of instructions) comprised in the executable code 37. These instruction(s) 38 may be arranged to use and process the information (e.g. temperature/pixel data matrix) comprised in the digital image file 35.

In another embodiment, the user could build the at least one instruction(s) 38 comprised in the executable code 37 by the use of at least one of the plurality of control devices 120. During the construction of the at least one instruction 38, which may be made possible by, for example, programming means in the processing unit 40, this information could be presented in real time before the user of the IR camera 1 during programming. This may be performed by, for example, a display device (e.g. a view editor of the IR camera 1) comprised in the plurality of control devices 120. The display device could, for example, have a touch sensitive display, or present the information according to the user's commands given to the processing unit 40 by e.g. thumb buttons, joysticks or a keyboard.

The at least one instruction 38 comprised in the executable digital image file 39, which may originate from the executable code 37 of the digital function file 145 or may be programmed by the user directly into the IR camera 1, are typically organized in such a way as to perform an action, such as, for example, a measurement or alarm function, a clearer presentation of results, etc. This may, for example, be performed in order to achieve an easier and more flexible interpretation of the information within the executable digital image file 39.

The instructions 38 comprised in the executable code 37 may typically include a series of text files, such as, for example, implicit include files as well as the script and the include files of the user. The bytecode of the instructions 38 may subsequently be executed, for example, on an abstract machine (also known as a virtual machine or emulator). The abstract machine normally comprises instructions organized as an instruction library (e.g. a native function library) embedded in the host application and corresponding host processor. The implementation of these instructions (e.g. native and/or wrapper functions) are used in implementing the interfaces between the abstract machine and the platforms (e.g. the IR camera 1 and an external device 150) in order to make the operations on the host processor (for example, a CPU 50 in the IR camera 1 or a processor in the external device 150) semantically equivalent to the original instructions.

These instructions could also link or wrap existing functions in the host environment, for example a software application written in a different programming language (to be able to reuse developed application software). In order to glue the existing functions, in for example the application software, a piece of instructions or code (e.g. in the native functions) is combined with another piece of instruction/code (e.g. the software or hardware application) which determines how the latter one is executed.

The inventive concept realised by a machine independent language, implements a cross-platform compatibility of the compiled binary code of the executable digital image file 39; or in other words, since the hardware and operating system dependence is reduced, the executable digital image file 39 could be executed independently of system architecture or platforms (i.e. software/hardware architectures) and therefore be transferred between and through different interfaces of such systems.

In practice, the executable code 37 may be generated by interpreting languages (e.g. Pearl) or compiling languages (e.g., Pawn, Java, C, etc.) which could either be compiled to machine independent code (i.e. bytecode or P-code; pseudo code) or machine dependent code (machine code).

Another possible field of use of at least two executable digital image files 39, also in accordance of the invention, are an interactive comparing of an image with a reference image (which could have been taken at an earlier stage perhaps years ago), in order to establish a structured and reliable way of making a validation of any aberrations in the images.

In one embodiment of the present invention it is also possible to link the executable code 37 to the digital image file 35 such that in all the communications and use in and between interfaces, parts or devices, that constellation is supported in the different computer system architectures it may encounter. In this embodiment the executable code 37 comprising at least one instruction 38 is preferably carried by the digital function file 145 to the central processing unit 50, whereby the executable code 37 may be linked with the digital image file 35. After this process, which generates a digital image file linked to an executable code, a linked unit defined as an executable digital image file 39 is generated. Further steps could in turn be to perform actions in accordance with at least one instruction 38 (normally a collection of instructions) comprised in the executable code 37 upon the information comprised in the digital image file 35. This may be carried out at once or later on, and if a plurality of instructions is concerned, one at a time, all together or in any combination thereof.

The executable digital image file 39 could be transferred and stored in the memory storage 60, e.g. the digital image file storage section 80 or the transmitting/receiving file storage section 90; alternatively the executable digital image file 39 may be re-routed to any of the interfaces media 130 and stored in a removable memory device, or transferred to an external device 150, where it may be stored or further processed.

Figure 4:
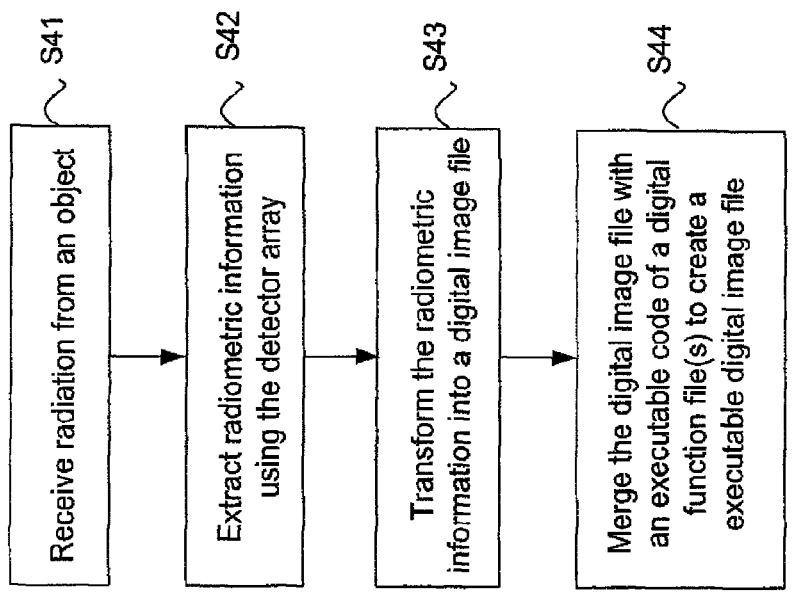
FIG. 4 shows a block diagram of a method for processing information according to an embodiment of the invention.

In FIG. 4, the steps for transforming the radiation from an object 4 to an executable digital image file 39 in an IR camera 1 according to an embodiment of the invention are shown.

In step S41, the radiation is received from an object 4 through the lens assembly 10 by a user aiming the IR camera 1 towards an area comprising at least one object of interest. In step S42, the radiometric information may be extracted from the radiation by the detector array 30.

In step S43, the radiometric information may be transformed into at least one digital image file 35. In step S44, the at least one digital image file 35 may be merged with the executable code 37 of at least one digital function file 145 in the central processing unit (CPU) 50 of the processing unit 40. This will result in an executable digital image file 39, which then may be stored in the memory storage 60, analysed, transferred, and/or transformed to a different system architecture for further analysis.

Figure 5:
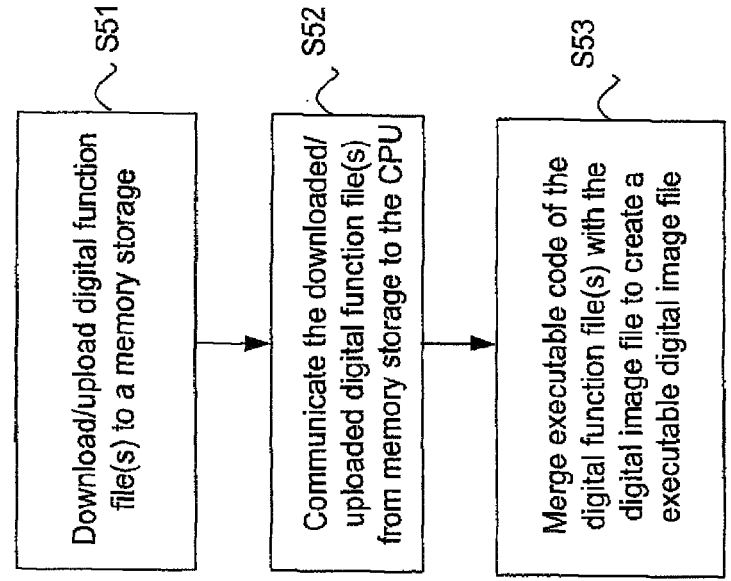
FIG. 5 shows a block diagram of a method for processing information according to another embodiment of the invention.

In FIG. 5, steps for creating an executable digital image file 39 according to an embodiment of the invention are shown.

In step S51, at least one digital file function 145 may be uploaded/downloaded to the memory storage 60, for example, to the transmitting/receiving section 90. This may, for example, be performed from an external device 150 and in the form of a downloadable package. The upload/download may be initiated by a user through the IR camera 1 or through the external device 150.

In step S52, the central processing unit (CPU) 50 in the processing unit 40 may communicate with the memory storage 60 (or the transmitting/receiving section 90) in order to retrieve the at least one digital file function 145.

In step S53, the executable code 37 of at least one digital function file 145 may be merged with at least one digital image file 35 in the central processing unit (CPU) 50 of the processing unit 40. This will result in an executable digital image file 39, which then may be stored in the memory storage 60, analysed, transferred, and/or transformed to a different system architecture for further analysis.

The description above is of the best mode presently contemplated for practising the invention. The description is not intended to be taken in a limiting sense, but is made merely for the purpose of describing the general principles of the invention. The scope of the invention should be ascertained with reference to the issued claims.

The invention claimed is:

1. A processor-implemented method for processing information in infrared (IR) images, the method comprising:
   receiving IR radiation from at least one object in an area;
   capturing radiometric temperature data from the IR radiation;
   generating at least one digital IR image file using the radiometric temperature data;
   storing the at least one digital IR image file and at least one digital function file comprising an executable code including compiled binary codes that are executable independent of system architecture or platform, wherein the executable code comprises at least one instruction for processing the radiometric temperature data captured from the IR radiation; and
   generating an executable digital IR image file by linking the executable code of the at least one digital function file with the at least one digital IR image file, thereby generating a linked unit defined as the executable digital IR image file to support execution of the executable digital IR image file in different computer system architectures for generating radiometric temperature alarms or performing radiometric temperature measurements, and wherein the at least one instruction comprised in the executable code is generated in response to a user providing input using at least one of a plurality of control devices.

2. A method according to claim 1, wherein the processing the radiometric temperature data comprises one or more of determining a maximum, minimum, or average temperature value in the digital IR image file, determining a temperature of a portion of the digital IR image file, determining isotherms in the digital IR image file, generating a temperature alarm based on the radiometric temperature data, and performing a temperature measurement based on the radiometric temperature data.

3. A method according to claim 2, further comprising executing the at least one instruction to generate the temperature alarm or to perform the temperature measurement based on the radiometric temperature data associated with the executable digital IR image file.

4. A method according to claim 1, wherein the executable code is written in a programming language independent of system architecture.

5. A method according to claim 1, further comprising performing an interactive comparing analysis of the information comprised in at least two separate executable digital IR images files, such that aberrations can be validated in a structured and reliable way.

6. A method according to claim 1, further comprising retrieving the at least one digital function file comprising the executable code.

7. A method according to claim 1, wherein the generating the executable digital IR image file, based on the at least one digital IR image file and the executable code of the at least one digital function file, comprises merging the executable code of the at least one digital function file into or with the at least one digital IR image file.

8. An apparatus for processing information in infrared (IR) images, the apparatus comprising:
   a lens assembly configured to receive IR radiation;
   an IR detector array configured to capture radiometric temperature data from the IR radiation;
   a processing unit configured to generate at least one digital IR image file using the radiometric temperature data;
   a memory storage configured to store the at least one digital IR image file and at least one digital function file comprising an executable code including compiled binary codes that are executable independent of system architecture or platform, wherein the executable code comprises at least one instruction for processing the radiometric temperature data captured from the IR radiation; and
   wherein the processing unit comprises a central processing unit which is configured to generate an executable digital IR image file by linking the executable code of the at least one digital function file with the at least one digital IR image file to generate a linked unit defined as the executable digital IR image file to support execution of the executable digital IR image file in different computer system architectures for generating radiometric temperature alarms or performing radiometric temperature measurements, and wherein the processing unit is configured to generate the at least one instruction comprised in the executable code in response to input received from a control device, the input being provided by a user interacting with the control device.

9. An apparatus according to claim 8, wherein the processing the radiometric temperature data comprises one or more of determining a maximum, minimum, or average temperature value in the digital IR image file, determining a temperature of a portion of the digital IR image file, determining isotherms in the digital IR image file, generating a temperature alarm based on the radiometric temperature data, and performing a temperature measurement based on the radiometric temperature data.

10. An apparatus according to claim 9, wherein the central processing unit is configured to execute the at least one instruction to generate the temperature alarm or to perform the temperature measurement based on the radiometric temperature data associated with the executable digital IR image file.

11. An apparatus according to claim 8, wherein the executable code is written in a programming language independent of system architecture.

12. An apparatus according to claim 8, wherein the central processing unit is configured to perform an interactive comparing analysis of the information comprised in at least two separate executable digital IR image files, in order to validate aberrations in a structured and reliable way.

13. An apparatus according to claim 8, wherein the central processing unit is configured to generate the executable digital IR image file by merging the executable code of the at least one digital function file into or with the at least one digital IR image file.

14. An apparatus according to claim 8, wherein at least one interface medium is in connection with a transmitting/receiving function storage section and configured to retrieve the at least one digital function file.

15. A non-transitory computer program product for use with a central processing unit (CPU) in a processing unit of an apparatus configured to capture radiometric temperature data from infrared (IR) radiation, the computer program product comprising computer readable code, which when run in the CPU causes the CPU to perform a method comprising:

generating at least one digital IR image file using the radiometric temperature data;

generating an executable digital IR image file comprising the at least one digital IR image file and an executable code of at least one digital function file; and wherein the executable code comprises compiled binary codes that are executable independent of system architecture or platform and at least one instruction for processing the radiometric temperature data captured from the IR radiation, the executable digital IR image file is generated by linking the executable code of the at least one digital function file with the at least one digital IR image file to provide a linked unit defined as the executable digital IR image file to support execution of the executable digital IR image file in different computer system architectures for generating radiometric temperature alarms or performing radiometric temperature measurements, and wherein the processing unit is configured to generate the at least one instruction comprised in the executable code in response to input received from a control device, the input being provided by a user interacting with the control device.

16. A computer program product according to claim 15, wherein the processing the radiometric temperature data comprises one or more of determining a maximum, minimum, or average temperature value in the digital IR image file, determining a temperature of a portion of the digital IR image file, determining isotherms in the digital IR image file, generating a temperature alarm based on the radiometric temperature data, and performing a temperature measurement based on the radiometric temperature data.

17. A computer program product according to claim 15, wherein said generating the executable digital IR image file comprises merging the executable code of the at least one digital function file into or with the at least one digital IR image file.

* * * * *